(12) United States Patent
Xia et al.

(10) Patent No.: US 12,034,612 B1
(45) Date of Patent: Jul. 9, 2024

(54) TECHNIQUES FOR TRANSFORMATIVE AND DERIVATIVE METERING

(71) Applicant: Amazon Technologies, Inc., Seattle, WA (US)

(72) Inventors: Zhihan Xia, Seattle, WA (US); Bo Wang, Kenmore, WA (US); Matthias Abraham, Berlin (DE); Brian Dahmen, Bainbridge Island, WA (US); Anket Dhulekar, Shoreline, WA (US); Timon Edward Ehrhart, Maple Valley, WA (US); Kai Feng, Bellevue, WA (US); Michael Fort, Redmond, WA (US); Dmytro Kovtun, Mountlake Terrace, WA (US); Diego Sebastian Macadar, Bellevue, WA (US); Daniel Martinez Maqueda, Berlin (DE); Zhi Qian, Bellevue, WA (US); Iuri Fernandes Queiroz, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 371 days.

(21) Appl. No.: 16/168,563

(22) Filed: Oct. 23, 2018

(51) Int. Cl.
*H04L 41/50* (2022.01)
*G06F 16/22* (2019.01)
*G06F 16/2455* (2019.01)
*G06F 16/84* (2019.01)
*H04L 12/14* (2006.01)

(52) U.S. Cl.
CPC ........ *H04L 41/5029* (2013.01); *G06F 16/221* (2019.01); *G06F 16/24568* (2019.01); *G06F 16/86* (2019.01); *H04L 12/14* (2013.01); *H04L 41/5032* (2013.01)

(58) Field of Classification Search
CPC .. G06N 20/00; G06F 16/2474; H04L 63/0281
See application file for complete search history.

(56) References Cited

U.S. PATENT DOCUMENTS

| | | | | |
|---|---|---|---|---|
| 5,758,351 A * | 5/1998 | Gibson | ............... | G06F 9/465 |
| 8,028,090 B2 * | 9/2011 | Richardson | ........... | H04L 67/327 |
| | | | | 709/238 |
| 8,321,588 B2 * | 11/2012 | Richardson | ........... | H04L 61/609 |
| | | | | 709/238 |
| 8,527,361 B2 * | 9/2013 | Paleja | ................. | G06F 8/30 |
| | | | | 705/26.1 |
| 8,640,220 B1 * | 1/2014 | Vincent | ................ | G06F 9/5027 |
| | | | | 726/13 |

(Continued)

*Primary Examiner* — Ranodhi Serrao
(74) *Attorney, Agent, or Firm* — Davis Wright Tremaine LLP

(57) ABSTRACT

A client of a metering service defines mapping data and derivation instructions comprising schema metadata and predicate metadata. The metering service provides usage information for a set of computing resources provided by one or more services of a computing resource service provider. As computing resources are utilized, usage records are generated. A derivation system may obtain one or more usage records and determine whether a predicate applies. If the predicate applies, a derivation function may be executed. For example, the derivation function may generate, from an original usage record, a derived usage record using mapping data provided by a client.

24 Claims, 8 Drawing Sheets

(56) References Cited

U.S. PATENT DOCUMENTS

| | | | |
|---|---|---|---|
| 8,930,364 B1* | 1/2015 | Brooker | G06F 16/40 |
| | | | 707/736 |
| 8,996,691 B1* | 3/2015 | Stickle | H04L 12/40071 |
| | | | 709/224 |
| 9,317,452 B1* | 4/2016 | Forschmiedt | G06F 21/53 |
| 9,444,820 B2* | 9/2016 | Muppidi | H04L 47/78 |
| 9,628,294 B1* | 4/2017 | Brandwine | H04L 69/167 |
| 9,772,911 B2* | 9/2017 | Barber | G06F 11/1471 |
| 9,830,179 B2* | 11/2017 | Nagargadde | H04L 43/08 |
| 9,846,540 B1* | 12/2017 | Franklin | G06F 3/0631 |
| 9,886,486 B2* | 2/2018 | de Castro Alves | |
| | | | G06F 16/24568 |
| 9,910,755 B2* | 3/2018 | Taylor | G06F 11/3476 |
| 9,940,377 B1* | 4/2018 | Sait | H04L 67/1097 |
| 9,971,751 B1* | 5/2018 | Sun | G06F 40/14 |
| 9,972,103 B2* | 5/2018 | de Castro Alves | |
| | | | G06F 16/24568 |
| 10,084,697 B2* | 9/2018 | Judge | H04L 12/4633 |
| 10,095,738 B1* | 10/2018 | Caldwell | G06F 16/9535 |
| 10,116,732 B1* | 10/2018 | Canton | H04L 41/0806 |
| 10,120,907 B2* | 11/2018 | de Castro Alves | |
| | | | G06F 16/24568 |
| 10,169,715 B2* | 1/2019 | Dirac | G06N 20/00 |
| 10,217,256 B2* | 2/2019 | de Castro Alves | G06T 11/206 |
| 10,318,882 B2* | 6/2019 | Brueckner | H04L 67/10 |
| 10,339,465 B2* | 7/2019 | Steele | G06N 20/00 |
| 10,380,600 B2* | 8/2019 | Bedoun | G06F 40/30 |
| 2012/0066408 A1* | 3/2012 | Richardson | H04L 61/609 |
| | | | 709/238 |
| 2015/0200941 A1* | 7/2015 | Muppidi | H04L 63/20 |
| | | | 726/1 |
| 2015/0379426 A1* | 12/2015 | Steele | G06N 20/00 |
| | | | 706/12 |
| 2015/0379427 A1* | 12/2015 | Dirac | G06N 20/00 |
| | | | 706/12 |
| 2015/0379429 A1* | 12/2015 | Lee | G09B 5/00 |
| | | | 706/11 |
| 2015/0379430 A1* | 12/2015 | Dirac | G06N 20/00 |
| | | | 706/12 |
| 2016/0085473 A1* | 3/2016 | Hershey | G06F 3/0604 |
| | | | 711/108 |
| 2016/0283331 A1* | 9/2016 | Barber | G06F 11/1471 |
| 2017/0024912 A1* | 1/2017 | de Castro Alves | |
| | | | G06F 16/24568 |
| 2017/0046367 A1* | 2/2017 | Chang | G06F 16/215 |
| 2018/0131678 A1* | 5/2018 | Agarwal | G06F 9/54 |
| 2018/0253735 A1* | 9/2018 | Bedoun | G06N 7/005 |

* cited by examiner

TECHNIQUES FOR TRANSFORMATIVE AND DERIVATIVE METERING

BACKGROUND

Resources provided by computing resource service providers are an important part of many customers' computing infrastructure. For example, a customer datacenter may provide some computing services using local resources managed by the customer and provide other computing resources through remote services that are provided and managed by one or more computing resource service providers. The computing resource service providers may provide services such as storage services, virtualization services, cryptographic services, event logging services, and database services. Resources provided to the customer may be persistent (e.g., pre-existing and/or post-existing use by the customer) or transient (e.g., created and destroyed upon demand), and dedicated to a single customer or shared between multiple customers.

In exchange for providing these services, computing resource service providers may track the resource use of each customer by metering. Metering is the process of measuring and recording the resource usage of an entire application, individual parts of an application, or tracking the resource usage of specific services and resources. Usage of resources over a time interval may be batched and recorded. Many service providers use this information to allocate costs to their customers; therefore providing an efficient and accurate metering system is important.

In some systems, there are challenges in modifying a usage record after it has been added to a batch. For example, it may be difficult, from a development standpoint, to modify a metering stack for a small short time transform that is required, and there may not be acceptable generic means to modify already metered records beyond re-consuming the output of the metering stack and submitting additional records. In some cases, these solutions are inefficient and may be impractical for large streams of data, which may be of the order of terabytes per second or even more.

BRIEF DESCRIPTION OF THE DRAWINGS

Various techniques will be described with reference to the drawings, in which.

DETAILED DESCRIPTION

Figure 1:
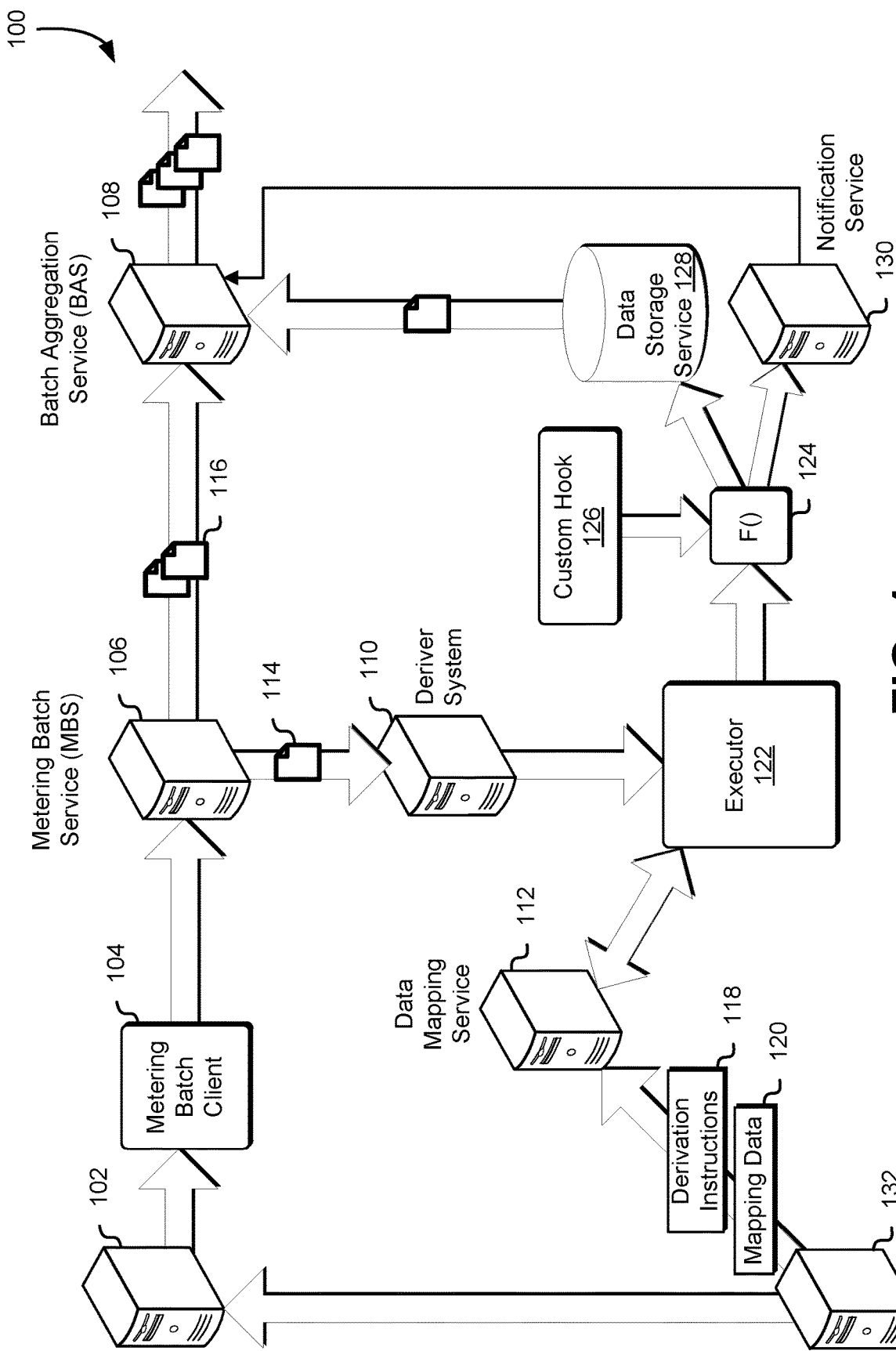
FIG. 1 illustrates a computing environment in which derived usage records are generated, in accordance with at least one embodiment.

Metering may be used to describe the process of measuring and recording the usage of different types of computing resources of a computing resources service provider. The computing resource service provider may provide access to applications, specific services and resources, and more. In some cases, a client computer system (e.g., on behalf of a customer) communicates with various services of the computing resource service provider to utilize various types of computing resources the client computer system may communicate with a compute service of the computing resource service provider to launch and utilize virtual machine instances to run computational tasks; the client computer system may communicate with a data storage service of the computing resource service provider to store and access data files; and more. As computing resources are utilized on behalf of a client computer system (also referred to herein simply as a "client") the usage of the computing resources may be recorded and attributed among the various client computer systems that interact with the computing resource service provider.

In some cases, customers (e.g., via a client computing device) access services which utilize underlying services. Consider an illustrative example in which a customer utilizes a downstream service to perform various types of computational tasks (e.g., Internet-of-Things analytics, machine-learning simulations, image/video processing). The downstream service may make use of various services such as a data storage service (e.g., to store data used in connection with the analytics, simulation, or media processing techniques) and a compute service (e.g., to analyze IoT data, generate a machine-learning model, encode multimedia). The data storage service and compute services, in this case and others, may be considered a fundamental service. A fundamental service may refer to a service that does not utilize computing resources of other services. A downstream service may refer to a service that utilizes other services. In some systems, the downstream service uses a fundamental service and the fundamental service generates a usage record. Techniques described herein may be used to generate derivative usage records. For example, a derivative usage record may be utilized to attribute usage of computing resources of a fundamental service to a downstream service and mark the usage of the fundamental service as being complementary (e.g., customer is not billed for the downstream service's usage of the fundamental service).

A metering service may be used to provide and/or determine usage information of computing resources for each metering cycle. A metering cycle may refer to a fixed period of time such as hourly, daily, or monthly. In an embodiment, each service provider that uses the metering service registers resources to be metered (e.g., tracked) with the metering system. In an embodiment, the service providers provide the metering service with update events such as when computing resources are created, destroyed, activated, deactivated, or when a resource is assigned to a different client. In an embodiment, the metering service stores these events to be used in determining the usage of computing resource.

A metering pipeline may refer to a data stream of computing resource usage records (also referred to as usage records) that are collected, batched, and made available in a continuous manner (e.g., as more usage is reported, more usage records are generated, processed, and made available to components of the metering pipeline). Batch records may be passed through a deriver system that monitors the batches and determines whether certain batches are whitelisted for derivation. If a batch is whitelisted for derivation (e.g., determined based on namespace associated with the usage records and/or pre-predicate filtering), a derivation routine may be performed in which the usage records are evaluated using a customer-defined predicate and, if the predicate is satisfied, results in execution of a corresponding customer-defined derivation function. The predicate may be a programmatic predicate supported in Java 8 and later versions. The customer-defined derivation function may use customer-defined mapping data to perform derivations on the original usage records, such as modifying attributes of the original usage record (e.g., attributing computing resource usage from a fundamental service to a downstream service).

Different types of derivations may be supported. As an example, a common derivation may refer to a derivation routine that can be executed according to a framework using instructions and data provided via the derivation instruction storage and the mapping data storage. Common derivation may be utilized to perform one-to-one transformations according to mapping data that a service team supplies to a data mapping service. The common derivation may be extendable to support customized derivations which perform operations that do not fit in a generalized framework and/or are specific to a particular service team. As an example, a derivation may support custom hook logic that a customer team can use to define code or otherwise cause execution of code (e.g., via a callback mechanism) that is used to perform customized derivations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: processing data streams and performing derivations of usage records according to client-specified predicates and derivation functions. The data structures described herein, such as the derivation instructions and the mapping data, are utilized to improve the functionality of a computer system by enabling the computer to perform transformative and derivative metering.

FIG. 1 illustrates a computing environment 100 in which various embodiments can be implemented. The computing environment 100 may be utilized to process batched usage records. In an embodiment, the computing environment includes a service provider 102 that utilizes a metering batch client 104 to communicate with a metering batch service (MBS) 106. The metering batch service may be utilized to filter batch records for derivation or, alternatively, to provide batch records to a batch aggregation service (BAS) 108 to be aggregated.

The service provider 102 may be a service of a computing resource service provider that provides access to computing resources. For example, the service provider 102 may be a data storage service that manages, on behalf of clients, the storage and retrieval of data to one or more persistent storage mediums, such as hard disk drives, magnetic cassettes, magnetic tape, magnetic disk storage or other magnetic storage devices. The service provider 102 may be a compute service that a client uses for compute resources such as virtual machine instances which can be provisioned and instantiated with compute resources for executing software code in various types of computing environments. Clients may access different types of service providers. In an embodiment, the metering batch client 104 is software that runs on the service provider that establishes a client-server relationship with a metering batch service 106. In various embodiments, establishing the client-server relationship includes authentication and/or authorization techniques.

The metering batch service 106 may be implemented as a web server such as those described in connection with FIG. 8. The metering batch service 106 may be implemented in the context of a computing resource service provider. In an embodiment, the metering batch service 106 receives and processes usage records in real-time. The usage records may reflect the utilization of computing resources of a computing resource service provider for example, when data is stored to a database that is hosted and operated by the computing resource service provider, a usage record may be generated indicating an amount of data that was stored (e.g., an amount of resource usage), an identifier associated with a user or identity that the storage caused the storage to occur, and a timestamp indicating when the data storage request was received by the storage system. The metering batch service 106 may perform various operations, such as receiving batch level usage records resulting from the usage of computing resources and persisting the records (e.g., using a data storage service). In an embodiment, metering records (also referred to as computing resource usage records, usage records of computing resources, usage records, etc.) are implemented as key-value pairs that are sent by or on behalf of service providers in the form of batches. Usage records or metering records may be supplied via the metering batch client. Generally speaking, a key-value pair may be represented as an arbitrary map of key-value strings. A metering record may be represented in Java or a Java-based language in the following manner:

Map<String, String>meteringRecord=new
  HashMap< >0 { {
  put ("usageType", "BoxUsage");
  put ("operation", "Createinstance: 004") I
  put ("timestamp", "1506046328");
  put("value", "1");
  put("resource","path/testInstance");
  put("payerId"," ");

In an embodiment, the metering batch service 106 monitors a data stream that collects usage records of computing resources. In an embodiment, usage of computing resources such as compute resources and data storage resources generates usage records (metering records) which are collected and aggregated by the metering batch service. A batch of records may refer to usage records collected over a fixed time interval, such as on a per-second, per-minute, or per-hour basis. A batch of records can be restricted or filtered to include only records having specific properties (e.g., only records associated with a particular customer of the computing resource service provider). In an embodiment, a metering service collects usage records from resource service providers (e.g., a compute service and a data service) using either a push or pull model, and the deriver system 110 monitors the data stream by accessing the usage records via the metering service. In an embodiment, the deriver system performing the monitoring in a continuous basis (e.g., in an ongoing manner, so that the monitoring of the data stream is not predicated on the occurrence of a specific event). In an embodiment, the deriver system monitors the data stream at fixed intervals of time. The metering batch service 106 may determine whether batches of records are whitelisted for derivation. In an embodiment, the metering batch service inspects attributes of a batch of records to determine an applicable namespace and determines whether the namespace is whitelisted for derivation. The determination may be made at least in part by accessing mapping data from a data mapping service 112. As an illustrative example, FIG. 1 depicts a scenario in which some batches are whitelisted (e.g., those represented by numeral 114) which are routed to the deriver system 110 and others that are not whitelisted (e.g., those represented by numeral 116) continue through the metering pipeline to the batch aggregation service 108.

The batch aggregation service 108 may be implemented as a web server such as those described in connection with FIG. 8. The batch aggregation service may be in charge of in-batch aggregation and indexing from batch file. The batched aggregation service 108 may receive batched records from the metering batch service 106. In an embodiment, the generation of derived usage records generates notifications which are dispatched and received by the batched aggregation service, which, in response to the notification, obtains additional out-of-band usage records (e.g., derived records) from the data storage service 128.

A derivation may refer to an ability for a service team to derive additional usage records or alter existing usage records based on the usage records submitted to the metering service. A namespace may refer to a logical grouping of a customer's metering artifacts in metering, a client identifier is used to identify metering batches for a service team. A derivation function may refer to the function that is to be executed on an incoming usage record to generate an outgoing usage record. Incoming and outgoing records may be associated with customer namespaces as defined in a contract definition. An input artifact may refer to an artifact that includes usage records associated with a source namespace, and an output artifact may refer to an artifact that includes usage records associated with a destination namespace. A contract may be an agreement between two service teams to share usage and perform derivations; the contract may include restrictions that determine what derivation can or cannot do.

In an embodiment, the data mapping service 112 is used by a customer computer system 132 to store transformation and derivation functions and data that can be utilized by the deriver system to perform derivations and other types of operations on whitelisted usage records. The data mapping service 112 illustrated in FIG. 1 may be implemented in accordance with computing devices and servers described in connection with FIG. 4. For example, the data mapping service 112 may be accessible via an interface wherein requests for data are routed to a caching layer of a database system that the data mapping service uses to store various types of data, such as derivation instructions and mapping data. The customer computer system 132 may specify derivation instructions 118 and mapping data 120 that are stored by the data mapping service 112 and used to perform common and/or custom derivations. In an embodiment, a derivation instruction that comprises a predicate schema and a function schema. In an embodiment, the customer computer system 132 refers to a downstream service and the service provider 102 refers to a fundamental service. A fundamental service may refer to a service that does not utilize computing resources of other services. A downstream service may refer to a service that utilizes other services. In some systems, the downstream service uses a fundamental service and the fundamental service generates a usage record. In an embodiment, a client of the customer computer system 132 submits a first request to the customer computer system 132 and the customer computer system 132 submits a second request to the service provider 102 to utilize computing resources of the service provider 102 as part of fulfilling the first request.

The predicate schema may refer to a schema or format that defines a predicate. A key schema may be used to define fields that could be retrieved from a source usage record which may be used as the predicate. The predicate may be referred to as a programmatic predicate. In an embodiment, the predicate is a functional interface containing exactly one abstract method. In various embodiments, such as those in accordance with Java 8 and later, a predicate may be used as the assignment target for a lambda expression. A predicate may be a function that returns a Boolean output value (e.g., TRUE or FALSE) that is dependent on the evaluation of one or more logical statements. Generally speaking, the output value is dependent on one or more input values to the function, although such need not be the case (for example, a predicate may simply always return TRUE). In an embodiment, the predicate is a computer-executable routine (e.g., executable code) such as a function or other type of callable object that is applied to a computing resource usage record to determine if any derivation records should be applied. In an embodiment, the predicate refers to a Java Predicate for a derivation of a computing resource usage record as such:

Predicate<Map<String, String>>isInstanceUsage=
    return r→r.get("usageType").equals("InstanceUsage");

The illustrative example of a predicate shown above may be implemented according to Java 8 and later. The example shown above illustrates a predicate where metering records are represented as a mapping of key-value strings and includes a key "usageType" where the predicate can be used to filter for usage types that match the value "InstanceUsage"—this is merely an illustrative example and other types of predicates are contemplated within the scope of this disclosure.

A predicate may refer to a predicate of any suitable programming language such as Java, C++, Python, and more. As an example, a C++ predicate is a callable object such as a function that returns a Boolean value or a value that can be used to determine a Boolean value. In an embodiment, the predicate is implemented according to C++ 11 or higher.

The function schema may refer to a schema or format that defines a function. A value schema may include two parts, a common field that defines files to be derived and additional data that defines data fields to be used for customized derivations. The key schema may be used as a function schema. A function may refer to any suitable routine and may be applied to a source metering record. The function can be used to generate additional metering records. In an embodiment, a function is represented as a Java construct. For example, the function may override (e.g., replace) one or more values of the key-value pairs representing usage records. In an embodiment, the function is used to generate a derivative record which replaces (e.g., is used in place of) a usage record that was obtained from a batch of records obtained from a data stream. In some embodiments, the function generates a record that is in addition to the usage record. An illustrative example of a function implemented according to Java 8 or higher may be in accordance with the following:

Function<Map<String,String>, List<Map<String, String>>>filtrationFunction=
    return r→{r.put("usageType", "FreeUsage"); Lists.newArrayList(r); };

In an embodiment, the derivation instructions are determined by a customer of the downstream service in any suitable manner. For example, the customer, via a client computer system, may access a command line interface or a graphical user interface that allows the user to define or specify the predicate and/or function. The downstream service, in some cases, exposes tools such as a client SDK that the customer can use to generate, compile, test, and validate computer-executable code, thereby validating prospective predicates and functions prior to defining the derivation instructions. In an embodiment, the customer (e.g., the customer using a client computer system having installed thereon a client SDK for the downstream service) accesses a webpage that provides, in a graphical setting (e.g., web browser) a pre-defined set of predicates and/or functions. In an embodiment, the user is able to customize some or all fields for a derivation instruction for example, the customer may fill in a first data field specifying a record key to filter on, a second data field that specifies an operation to perform (e.g., to replace filtered records, to create new records derived from the filtered records), and a third data field that specifies how to perform the operation (e.g., in the case of a transformation function, what value(s) should be inserted to the filtered records). The customer, in an embodiment, provides mapping data to the data mapping service that indicates the mapping of predication data and derivation data. In an embodiment, this is used for a one-to-one mapping derivation. In other use cases, it can be treated as a customized derivation.

In an embodiment, the mapping data 120 indicates the mapping of predication data and derivation data and is used for one-to-one mapping derivation. In an embodiment, other use cases are not supported as part of the standard derivations but may be supported as customized derivations. A customer (e.g., service team) may define the mapping data and submit it to be stored by the data mapping service 112 in a database.

The deriver system 110 may be implemented in accordance with those described in connection with FIG. 3. The deriver system 110, in an embodiment, is implemented using virtual computing resources, data storage resources, database processing resources, cryptographic resources, key management resources, networking resources, serverless program execution services, and other resources. In an embodiment, the deriver system performs various operations such as filtering data, obtaining derivation instructions associated with the namespace of a batch of records being processed, determining which version of the instructions to use based on the record metering time, obtain mapping data and/or additional data for customized derivation, and more. The deriver system 110 may be utilized to initialize, provision, or otherwise cause execution of an executor. An executor may refer to executable code that is executed for each type of applicable derivation. The executor 122 may be used to execute one or more derivation functions 124 (e.g., the executor executes the derivation function directly or submits a computational task to another computing entity to perform the derivation function).

The derivation function 124, in an embodiment, is used to create one or more records that are derived from a source metering record (e.g., the whitelisted usage record illustrated in FIG. 1) that had been previously metered through the metering pipeline. In an embodiment, the derivation function is executed based on the evaluation of a predicate. In some embodiments, the derivation function 124 is used for one-to-one mapping derivation. Other types of derivations may be supported through the use of a custom hook 126 that a service team can define. The custom hook may be in accordance with those described elsewhere in this disclosure, such as in connection with FIGS. 2-7. The custom hook which may also be referred to as custom hook logic may refer to executable code that a client can provide to perform custom derivations which may not be supported by common derivations. In an embodiment, common derivations are used to perform one-to-one mapping derivations and custom hook logic is used to define custom derivations that are in addition to one-to-one mapping derivations.

The result of running the derivation function 124, in an embodiment, is one or more derived usage records. In an embodiment, the one or more usage records replaces or is used in place of the whitelisted usage record that was routed away from the metering pipeline to the deriver system. In an embodiment, derived usage records are generated and created in addition to the whitelisted usage record (which may be included as a usage record that is stored in the data storage service 128).

In an embodiment, the data storage service is any suitable storage system that can be used to store usage records such as the one or more usage records generated as a result of execution of the derivation function. In an embodiment, the data storage service supports the storage of data objects organized into data buckets. In an embodiment, the notification service 130 is a service of the computing resource service provider that transmits a notification to the batch aggregation service 108 upon completion of the derivation function and/or storage of the derived usage records. The batch aggregation service 108 may, upon receiving the notification, retrieve derived usage records from the data storage service 128 and aggregate those usage records into a batch with other usage records (e.g., with records which were not whitelisted and routed to the deriver system for derivation). In an embodiment, the notification includes an indication of a network address or network location where the derived usage record may be accessed. For example, the notification may include a uniform resource identifier (URI) that specifies a network address or network location that can be provided to the computing resource service provider and the computing resource service provider can retrieve the derived usage record (e.g., from a data storage service) using the URI.

Figure 2:
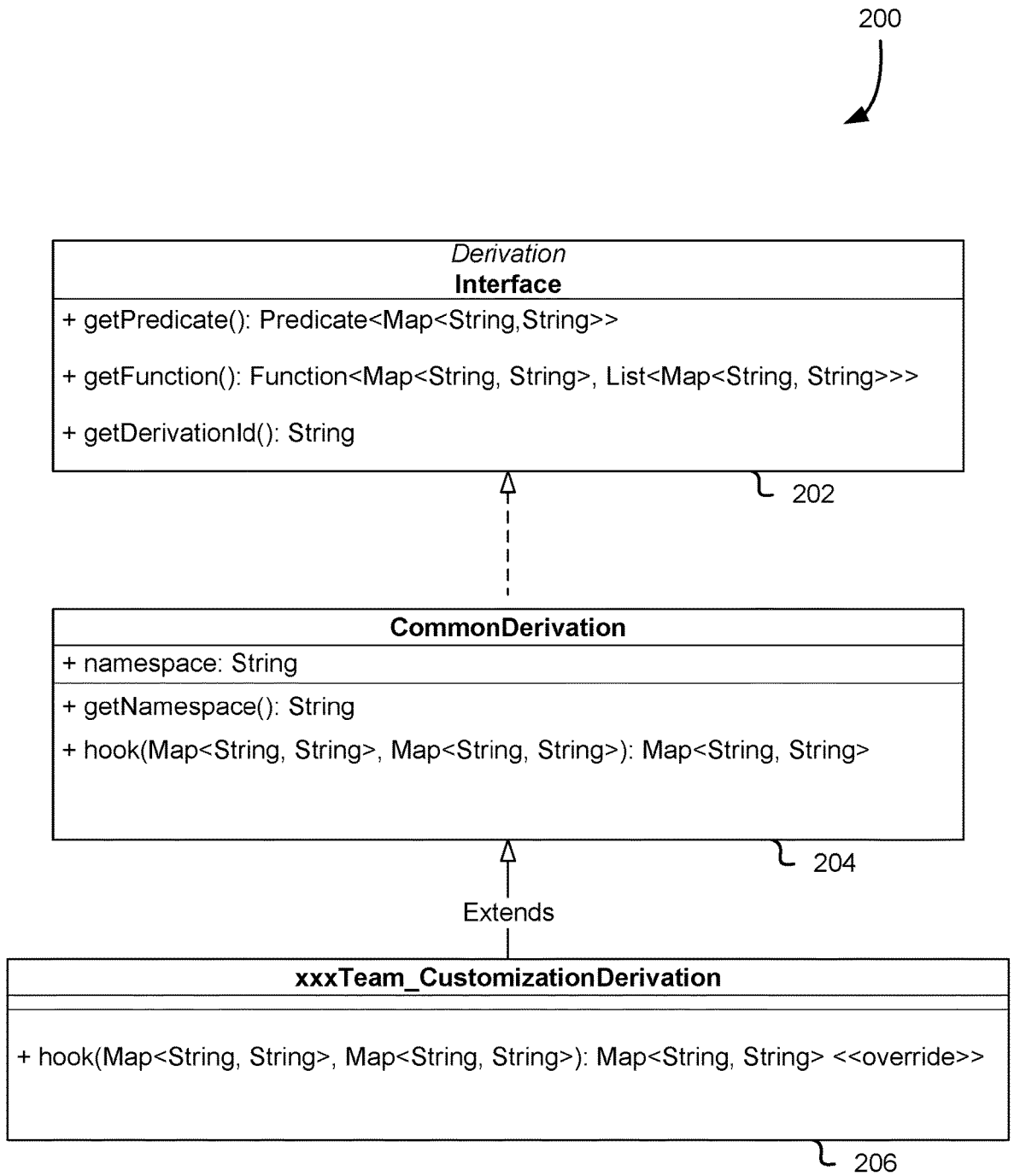
FIG. 2 illustrates a class diagram, in accordance with at least one embodiment.

FIG. 2 illustrates a class diagram 200 according to which various embodiments may be implemented. The class diagram may be a UML diagram. Various classes, attributes, functions or operations, overrides, associations, etc., may be implemented according to the illustrative example shown in FIG. 2. Embodiments described elsewhere in this disclosure, such as those discussed in connection with FIG. 1, may be implemented in accordance with the class diagram illustrated in FIG. 2.

In various embodiments, an abstract derivation interface 202 defines a set of operations or functions that are to be implemented. For example, the interface may include accessor operations to obtain a predicate, obtain a function, obtain a derivation identifier, or any combination thereof. The accessor operators may have public visibility (e.g., as opposed to private or protected).

In an embodiment, the derivation interface is realized or implemented by common derivation 204. The common derivation class may have one or more attributes, such as a namespace attribute, may implement the derivation interface, and may, furthermore, include additional attributes such as an accessor to obtain the namespace, and also a hook function. In an embodiment, the common derivation hook function can be overridden by a second class that extends the common derivation class. In an embodiment, the hook operation implemented by the common derivation does not perform any additional functionality for example, it may be a no-op, return immediately without performing any custom logic, and so on.

A service team can define a customization derivation 206 that has custom hook logic. As illustrated in FIG. 2, the xxxTeam_CustomizationDerivation class (where xxx may be a placeholder or otherwise representative of a particular team, whose namespace, identifier, or other distinguishing attribute may be used in the class name for clarity) may extend the common derivation class by overriding the hook operation.

Figure 3:
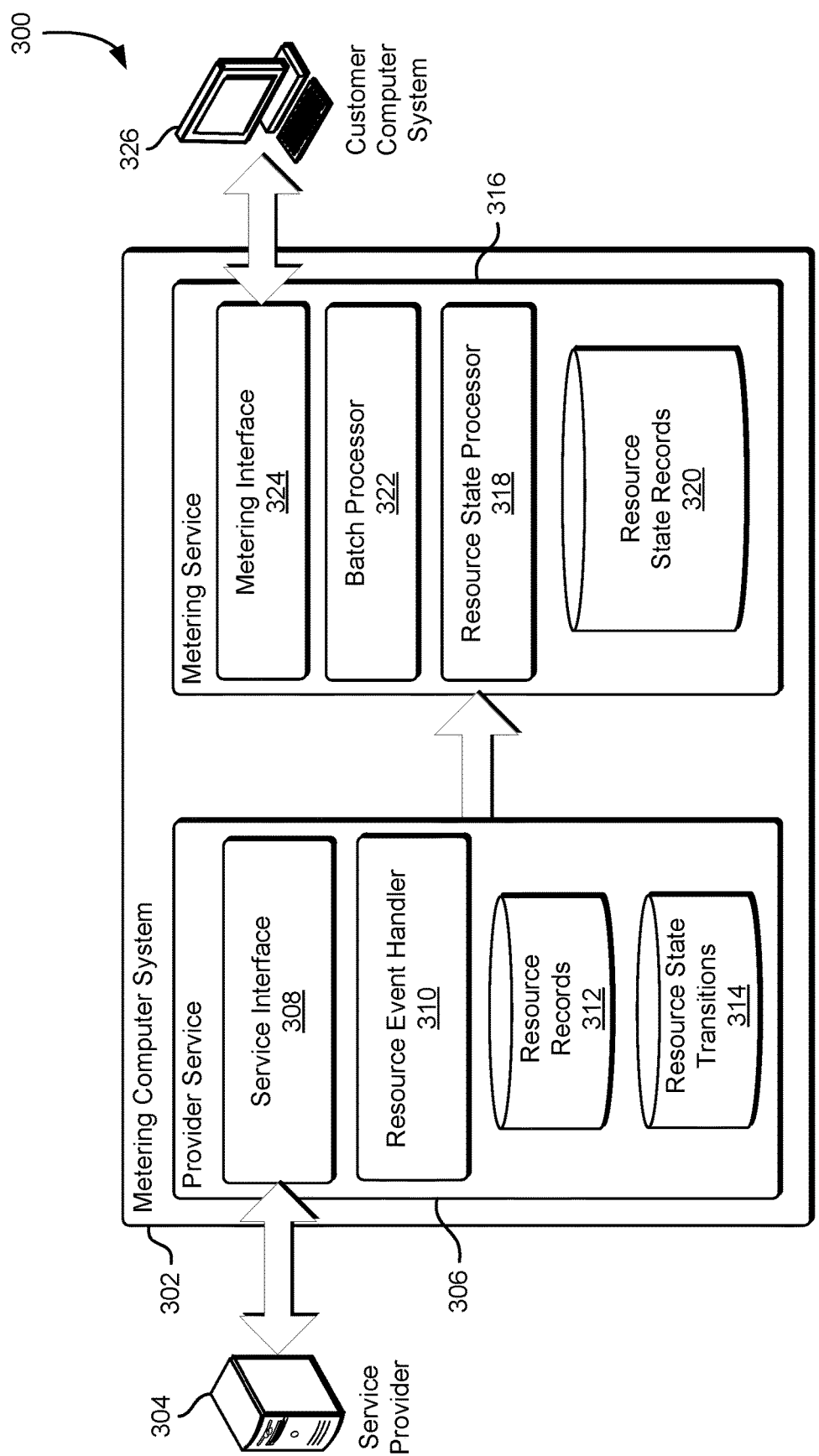
FIG. 3 illustrates a computing environment in which a metering computer system is implemented, in accordance with at least one embodiment.

FIG. 3 illustrates a metering service in accordance with one embodiment. In an embodiment, the computing environment 300 illustrates a metering service 302 that collects resource usage events from one or more service providers and produces resource use information for specified time intervals. In an embodiment, the metering service 302 is a server computer system, a server cluster, a virtual computer system, a virtual server, a virtual runtime environment, a container environment, a serverless execution environment, or service hosting system. In an embodiment, the metering service 302 hosts one or more services made up of executable instructions stored on physical computer readable media that, when executed by a processor of the metering service 302, implement various component services. In an embodiment, the metering service 302 receives metering information from a service provider computer system 304.

In an embodiment, the service provider computer system 304 is a computer system, server, server cluster, virtual computer system, or computing runtime that hosts a metering agent service. The service provider may alternatively be referred to as a computing resource service provider. The service provider computer system 304 may be implemented as an application server in accordance with those described in connection with FIG. 8. In an embodiment, the metering agent service comprises a set of executable instructions stored in memory on the service provider computer system 304 that, when executed by a processor of the service provider computer system 304, performs functions that collect the metering information from a computing service and provide the metering information to the metering service 302. In an embodiment, the metering information includes resource registration events. In an embodiment, resource registration events are generated in response to the computing service, creating a new resource that can be provided to a customer. In an embodiment, a resource registration event may include a resource identifier, a time of resource creation, a customer account identifier to which the resources are allocated, a resource cost, and other resource information. In an embodiment, the metering information includes resource status events. In an embodiment, resource status events are generated in response to a change in the state of the resource or a change of the customer to which the resources are allocated. In an embodiment, resource status events may include one or more of resource activation events, resource deactivation events, resource destruction events, and resource creation events.

In an embodiment, the metering service 302 includes a provider service 306 and a metering service 316. In an embodiment, the provider service 306 is made up of a collection of executable instructions stored on tangible media on the metering service 302 that, when executed by a processor of the metering service 302, implements the components of the provider service 306. In an embodiment, the provider service 306 includes a service interface 308, a resource event handler 310, a resource records store 312, and a resource state transitions store 314. In an embodiment, any of the data stores within the metering service is comprised of solid-state storage devices (such as RAM, flash memory, or SDRAM), other storage devices (such as optical disc memory magnetic disk memory), or network attached storage devices that are accessible to the metering service 302. In an embodiment, the service interface 308 provides an interface to receive the resource information from the service provider computer system 304. In an embodiment, the service interface 308 is a web service interface and the resource information is sent to the metering service 302 via an HTTP connection. In an embodiment, the service interface 308 sends the resource information received from the service provider computer system 304 to the resource event handler 310. In an embodiment, the resource event handler 310 stores the resource information in the resource records store 312 and the resource state transitions store 314. In an embodiment, resource creation events (or resource registration events) cause the resource event handler 310 to generate a new resource record in the resource records store 312. In an embodiment, reception of a resource status event causes the resource event handler 310 to store the resource status event in the resource state transitions store 314.

In an embodiment, the metering service 316 processes stored resource information to produce resource usage information for specified time intervals. In an embodiment, the metering service 316 includes a resource state processor 318. In an embodiment, the resource state processor 318 reads the resource information from the resource records store 312 and the resource state transitions store 314 to determine the state of resources provided to a particular customer account at a particular point in time. In an embodiment, the state of the resources provided to the particular customer account is stored in a resource state records store 320.

In an embodiment, the metering service 316 includes a batch processor 322. In an embodiment, the batch processor 322 identifies a time interval over which resource usage will be determined. In an embodiment, the time interval is provided by a billing system. In an embodiment, the time interval is specified by the computing service that is providing the resources to the customer. In an embodiment, the time interval is a periodic interval that is configured by an administrator of the metering service 302. In an embodiment, the batch processor 322 retrieves the state information in the resource state records store 320, and applies the resource state events that are applicable to the identified time interval to determine the resource usage over the identified time interval. In an embodiment, the resource usage over the identified time interval is communicated to a metering interface 324, and the metering interface 324 provides the resource usage over the identified time interval to a customer computer system 326. In an embodiment, the metering interface 324 provides the usage information to a web interface on the customer computer system 326. In an embodiment, the usage information is provided to a billing system, and the billing system provides a bill to the customer computer system 326 that reflects the usage information.

Figure 4:
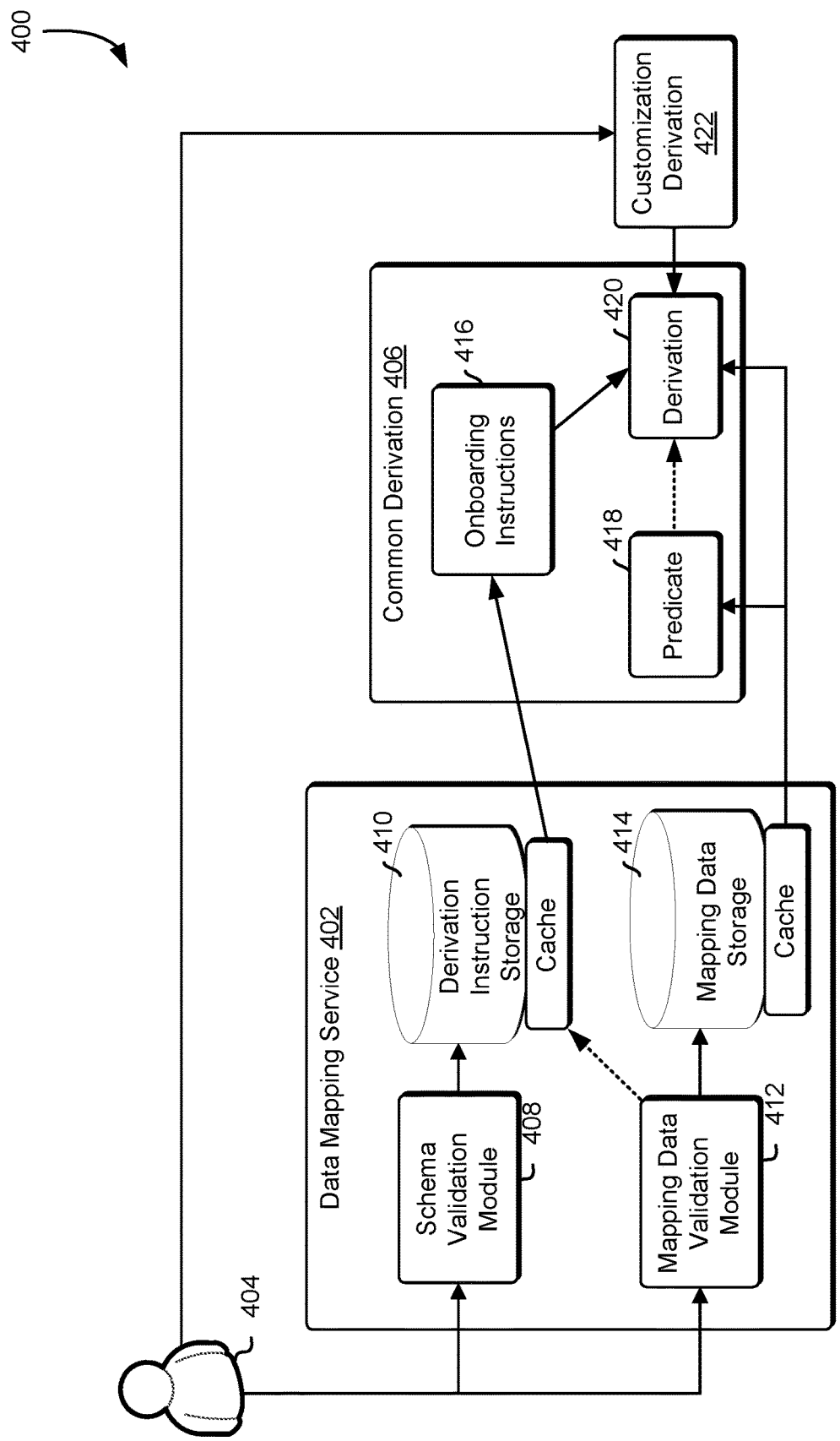
FIG. 4 illustrates a computing environment in which a data mapping service is implemented, in accordance with at least one embodiment.

FIG. 4 illustrates a computing environment 400 in which a data mapping service is used by a service team to store transformation and derivation functions and data that can be utilized by a metering deriver system, in accordance with at least one embodiment. The data mapping service 402 illustrated in FIG. 4 may be implemented in accordance with computing devices and servers described in connection with FIG. 8. The data mapping service 402 is, in an embodiment, implemented as part of a metering service that implements techniques for transformative and derivative metering. The customization derivation system 422 illustrated in FIG. 4 may be implemented according to computing devices and servers described in connection with FIG. 8.

The data mapping service 402 illustrated in FIG. 4 may be a service that is accessible to service team customers of a computing resource service providers. Service teams customers may be distinguishable from other types of customers in the computing resource service provider for example, a service team customer may refer to a customer or computing entity that provides computing resources to other customers for example, a service team customer may be a customer that implements a software downstream service where software code of the service team is executed using compute resources provided by a service that provides virtual machine resources. A customer of the downstream service may be billed for using the downstream service which, in turn, utilizes virtual machine instances of the compute service to execute instances of the application. The data mapping service 402, in an embodiment, is implemented using virtual computing resources, data storage resources, database processing resources, cryptographic resources, key management resources, networking resources, serverless program execution services, and other resources. The data mapping service 402, in an embodiment, allows service teams to store one-to-one transformation logic and data that can be used by a deriver system in metering record derivation.

A customer 404 may utilize a client computer system to communicate with the data mapping service 402 and, optionally, customization derivation. The customer 404 may refer to a computer system operated by a customer that includes executable code (e.g., a client SDK installed thereon) that the computer system uses to communicate with services of a computing resource service provider. In an embodiment, the customer refers to a service team that operates and/or controls a service that is operated by the computing resource service provider on behalf of the service team.

The custom derivation 406 may refer to a type of derivation in the deriver system that, in an embodiment, is instanced for multiple service team use cases. The custom derivation, in an embodiment, derives new usage from source metering records (e.g., a map data structure) and replaces it with given mapped strings for specific keys. If a service team requires more complex logic than is encoded in the derivation instructions, the service team, in an embodiment, provides an extended custom derivation with overrided hook logic. Hook logic, in an embodiment, refers to executable code that takes the original usage records and required data from the data mapping service and returns one or more derived usage records as a result of execution of the hook logic.

In an embodiment, the data mapping service 402 is implemented on a fleet of hardware servers hosted and/or under the control of a computing resource service provider. The data mapping service 402 may have an interface over which a customer service team (e.g., via a client computing device) is able to issue commands and requests to the data mapping service 402. In an embodiment, the data mapping service 402 includes a schema validation module 408. The schema validation module 408 may be implemented as a software application, a module of a software application (e.g., a dynamically linked library), etc., that is executed in the context of the data mapping service 402. In an embodiment, the data mapping service 402 receives a request from the customer 404 to store derivation instructions, the derivation instructions comprising one or more schemas such as a predicate schema and a derivation schema. The derivation instructions may be in accordance with those described in connection with FIG. 2. For example, the derivation schema may comprise a predicate schema and a function schema, the schemas in accordance with those described in connection with FIG. 2. The schema validation module 408 may include executable instructions that, as a result of execution by one or more processors, causes the one or more processors to validate a schema provided by the customer 404 conforms with a specified format, verifies that fields specified in a schema are correctly formatted, etc.

The derivation instruction storage 410 may refer to a storage system such as a database storage system that stores customers' derivation instructions. The derivation instruction storage 410, in an embodiment, is a non-relational database such as a NoSQL database service that supports key-value data storage. In an embodiment, the derivation instruction database 410 supports storage of one or more of the following attributes: identification attribute that includes a namespace and version; namespace attribute that is a unique identifier for onboarding team, which may be assigned by the computing resource service provider; a key schema attribute that defines fields that can be retrieved from source usage records, and can be used as the predicate 418 illustrated in FIG. 4; a value schema attribute that defines common fields to be derived, and additional data that defines data fields to be used for customized derivation, and can be used as a function schema; an operation attribute that has a set of enumerated operations (e.g., reflecting different operation states such as creation, activation, deactivation); a creation timestamp attribute that indicates the time client requests to perform the operation described above; an effective timestamp attribute that indicates the start time of the derivation instruction, which may keep a static time offset from the creation timestamp, so as to avoid inconsistency due to the gap between custom derivation retrieve the latest instructions; a version attribute that is used for deterministic derivation and keep track of schema history; and any combination thereof. The derivation instruction storage 410 may have a corresponding caching layer that provides low-latency, high availability access to data of the derivation instruction storage 410. The caching layer, in an embodiment, is a fully managed, highly available, in-memory cache that replicates the data of the derivation instruction storage 410. Various caching techniques may be utilized to maintain consistency and/or coherence. The caching layer may be used to reduce database response times from the order of milliseconds to microseconds. An example database table schema and sort/search index may be in the following format:

DerivationInstruction_table: {
Namespace: string,
Identification: string,
Version: number,
Key Schema: string,
Value Schema: string,
Operation: string,

```
Creation Timestamp
Effective Timestamp: number
}
// Support: Get all operations for derivation instruction
    with namespace
primary_idx: {
Identification: HASH_KEY,
Effective Timestamp: RANGE_KEY
}
// Support: Given namespace, fetch all versioned schema
global_secondary_idx: {
Namespace: HASH_KEY
}
```

In an embodiment, the mapping data validation module 412 is a software module (e.g., application, DLL, statically linked library, applet) that is executed within the context of the data mapping service 402. Mapping data may be provided by the customer 404 to the data mapping service 402 and routed to the mapping data validation module 412 to perform a set of validation checks that, if satisfied, results in the mapping data being stored to the mapping data storage 414 illustrated in FIG. 4. In an embodiment, the mapping data indicates the mapping of predication data and derivation data and is used for one-to-one mapping derivation. In an embodiment, other use cases are not supported as part of the standard derivations but may be supported as customized derivations. The mapping data validation module, in an embodiment, verifies that mapping data provided by the customer encodes a one-to-one mapping derivation and verifies that one-to-one mapping is supported by verifying that the fields indicated are valid fields for derivation. In some embodiments the mapping data validation module 412 cross-references the derivation instruction storage (e.g., as illustrated in FIG. 4 by the dotted line). In an embodiment, the mapping data validation module 412 interfaces with a cache of the derivation instruction storage 410 to obtain derivation instruction data.

The mapping data storage 414 may be implemented using techniques described above in connection with the derivation instruction storage 410. For example, the mapping data storage may be a non-relational database such as a NoSQL database service that supports the storage of key-value mappings. The mapping data storage 414 may have a corresponding caching layer that provides low-latency, high availability access to data of the mapping data storage 414. The caching layer, in an embodiment, is a fully managed, highly available, in-memory cache that replicates the data of the mapping data storage 414. Various caching techniques may be utilized to maintain consistency and/or coherence. The caching layer may be used to reduce database response times from the order of milliseconds to microseconds. In an embodiment, the derivation instruction storage 410 and the mapping data storage 414 are different tables of the same database system. Mapping data may be stored in a dynamic database table to store key-value mapping data, as original and transformed data for derivation. Both key and instance may be validated by corresponding schemas. In an embodiment, the MappingData table is immutable. An example database table schema and sort/search index may be in the following format:

```
MappingData_table: {
Id: string, // Id=namespace_Version_GeneratedKey
Creation Timestamp,
Key: string,
Value: string,
status: string // DISABLED or ENABLED
}
// Support: Given Id (namespace, version and key), fetch
    all mapping data
primary_idx; {
id: HASH_KEY,
Creation Timestamp: RANGE_KEY
}
```

A common derivation 406 may refer to a derivation routine that can be executed according to a framework using instructions and data provided via the derivation instruction storage 410 and the mapping data storage 414. A common derivation may, furthermore, support hook logic that can be overloaded or overridden by different service teams to provide different logic that the particular service teams can customize. Interfaces for derivations may be in accordance with those discussed in connection with FIG. 2. In an embodiment, a common derivation is performed by obtaining onboarding instructions 416 from the derivation instruction storage 410 or a caching layer that exposes data stored thereon. The onboarding instructions may be obtained by submitting a request to the data mapping service 402 that includes a specific client identifier and derivation instructions that are associated with that client identifier are retrieved and returned as part of a response to the request. As part of the common derivation 406, a deriver system may also obtain mapping data from the mapping data storage 414 which are used to determine a predicate 418 and a derivation 420. Upon evaluation of the predicate 418 and determining that the predicate applies, the system may perform the derivation 420 according to the onboarding instructions 416 for example, by changing the attribution of a particular field value from one service to another (e.g., from an underlying service such as a compute service or a data storage service to a downstream service that utilizes those underlying services).

In some embodiments, a customization derivation 422 may also be specified by the customer. The customization derivation may be a computer system that executes custom logic that the customer 404 needs to run which does not conform to the requirements imposed for common derivation (e.g., by the schema validation module and the mapping data validation module). The customization derivation 422 may extend the functionality of the common derivation by overriding hook logic of the common derivation with logic that the customer 404 provides with custom hook logic. In an embodiment, the common derivation has a hook function that is a pure virtual function that is required to be implemented by a derived class that is specific to each customer. A specific customer may use this hook function to perform custom logic, or may have it simply return immediately (e.g., effectively a no-op) if no custom logic is needed.

Figure 5:
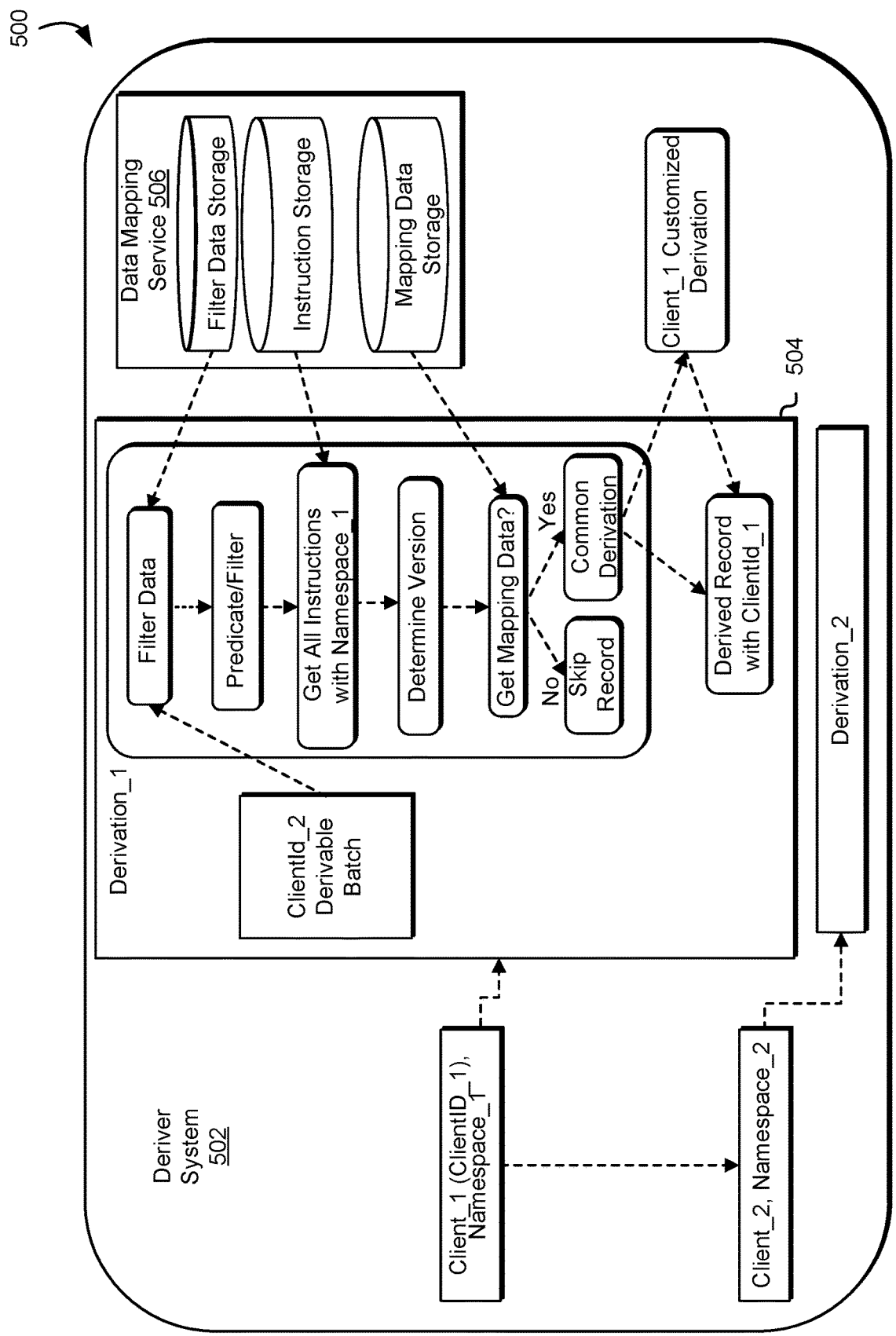
FIG. 5 illustrates a computing environment in which a deriver system is implemented, in accordance with at least one embodiment.

FIG. 5 shows an illustrative example of a computing environment 500 in which a deriver system 502 is implemented, according to at least one embodiment. The deriver system 502 may be implemented as any suitable computing entity, such as devices and servers described in accordance with FIG. 8. In accordance with at least one embodiment, FIG. 5 illustrates deriving a usage record on behalf of a first client (e.g., client indicated as Client1, ClientId_1, etc.).

In an embodiment, the deriver system 502 is a computing entity that is capable of performing derivations (e.g., multiple derivations in parallel). Different clients of the deriver system may have different associated namespaces (e.g., Client_1 is associated with Namespace_1). A first derivation routine 504 may correspond to a derivation based on instructions and mappings provided for or otherwise associated with the first client. As part of the first derivation routine 504, a derivable batch of usage records may be obtained. Generally, any batch of records may be obtained (derivable or not). As an illustrative example, the derivable batch is associated with a second client different from the first client. As part of a preliminary step (e.g., optional in some embodiments), the deriver system updates a filter data cache. This pre-predicate filtering may be used to reduce the amount of I/O traffic to a data mapping service. Pre-predicate filtering may also be referred to as coarse predication. In an embodiment, the client specifies a filtering data such as the filter type and filter data, which is stored as attributes of a mapping data table for the client identifier. In an embodiment, the data mapping service uses a separate table to cache the set of filter data. The filter type, in an embodiment, is a field or attribute that may be present in usage records. The filter data, in an embodiment, is a corresponding value of the filter type that indicates a usage record is derivable (whether a derivation is to actually be performed may also be based on evaluation of a more precise predicate). The filter data storage may be a database table of the data mapping service, or any other suitable data storage device/system. The data mapping service 506 may be implemented in accordance with those described elsewhere in this disclosure, such as in connection with FIG. 4.

Upon determining that a filter and/or predicate applies, the deriver obtains derivation instructions associated with the applicable namespace. In an embodiment, different versions are valid over different time intervals. In an embodiment, the deriver system obtains all versions of the derivation instructions associated with the applicable namespace. The deriver system may obtain mapping data from the data mapping service. If there is no applicable mapping data (e.g., a null value or other suitable indicator is returned), then the derivation routine exits as no derivation is required. However, if suitable mapping data is received, the derivation system may, in some embodiments, first perform a common derivation using the mapping data and then determine whether a customized derivation is specified. If so, then the system may execute custom hook logic supplied by the client. In some embodiments, the execution of a customized derivation includes execution of the common derivation. The result of the derivation routine is the generation of one or more derived usage records.

Figure 6:
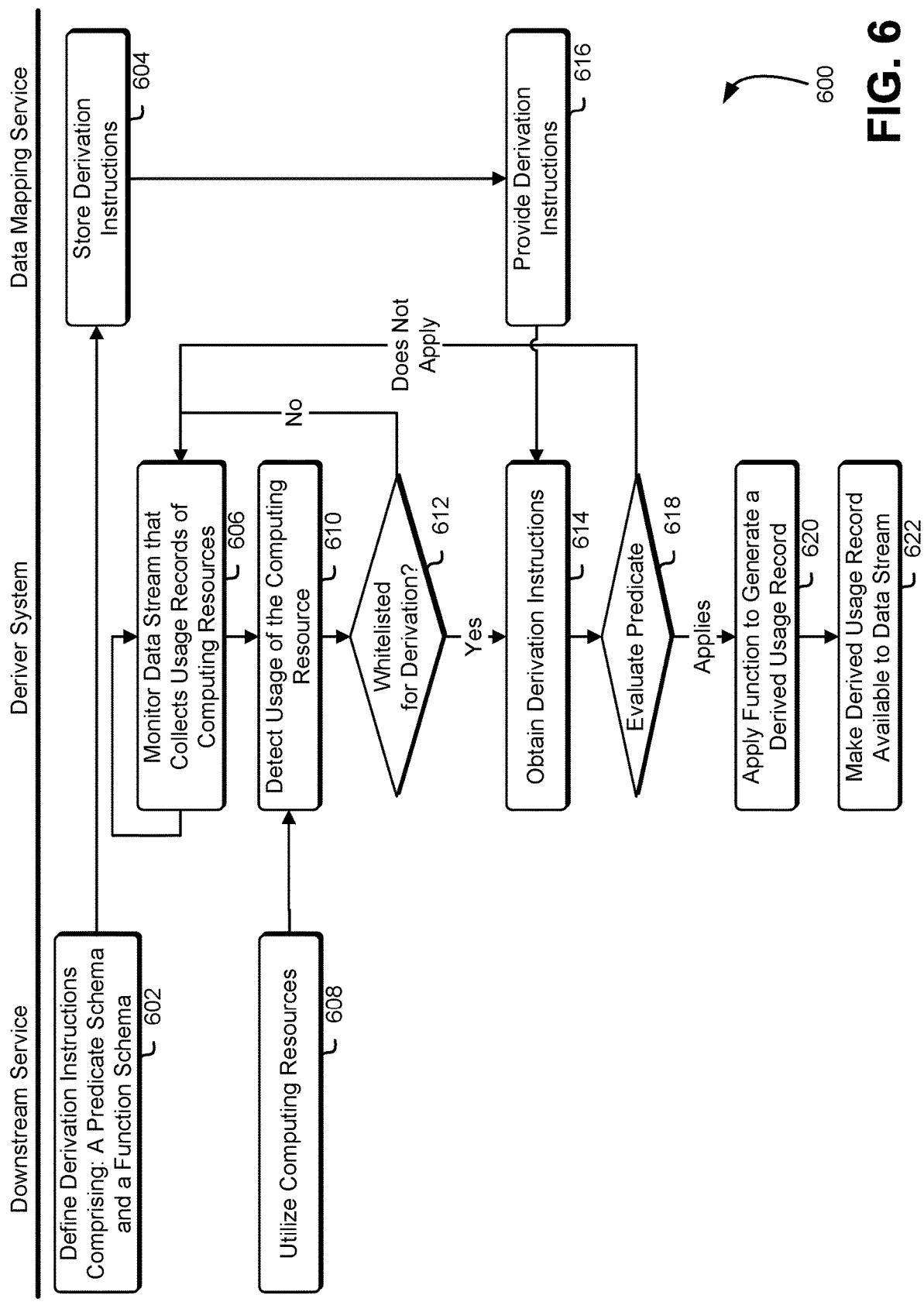
FIG. 6 shows an illustrative example of a process for generating derivative records based on the usage of computing resources within the context of a computing resource service provider, in accordance with at least one embodiment.

FIG. 6 shows an illustrative example of a process 600 for generating derivative records based on the usage of computing resources within the context of a computing resource service provider, in accordance with at least one embodiment. The process 600 may be implemented using a downstream service, deriver system, and data mapping service. In an embodiment, the downstream service, deriver system, and data mapping service are computing devices and servers that are implemented in accordance with FIG. 8. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

The application server illustrated in FIG. 6 may be a service provider of the computing resource service provider that is accessible to customers of the computing resource service provider—for example, a client computer system may have installed thereon a client SDK that the client computer system utilizes to communicate with the downstream service using a set of defined web application programming interface (API) commands. The client computer system may communicate with the application server by submitting requests over a network such as the Internet. In an embodiment, the downstream service refers to computer software that is executed on a set of computing resources of the computing resource service provider that is used to implement software application functionality. The downstream service may utilize various computing resources of the computing resource service provider, which in turn may be accessible via a service for example, a downstream service that implements a set of web API commands that allow a client to analyze data and generate predictive models may utilize a data storage service (e.g., to store the training and evaluation data for performing a machine-learning algorithm) and a compute service (e.g., to run a machine-learning algorithm on a virtual machine instance). A downstream service may refer to an application that is executed using one or more services provided by the computing resource service provider and may include, for example: analytics services (e.g., an Internet-of-Things Analytics services; machine-learning services; and more. In an embodiment, the downstream service is a service provider of the computing resource service provider that customers of the computing resource service provider have access to via a network such as the Internet.

The deriver system illustrated in FIG. 6 may be in accordance with deriver systems and derivers described elsewhere in this disclosure, such as those described in accordance with FIG. 5. While a deriver system is illustrated in FIG. 6, other implementations, such as those where the deriver is a software module (e.g., dynamically linked library) that executes within the context of a software application executed in connection with the execution of a metering service, are also contemplated within the scope of this disclosure. In an embodiment, the deriver is implemented as software code that is executed as part of a service of a computing resource service provider that receives and processes usage records of computing resources of the computing resource service provider.

The data mapping service illustrated in FIG. 6 may be in accordance with those described elsewhere in this disclosure, such as those described in connection with FIG. 4. In an embodiment, the data mapping service is accessible to the deriver or deriver system but is exposed externally—for example, there may be communication end-points to the data mapping service that are accessible to the deriver or deriver system, but not to the client of the downstream service. In an embodiment, the data mapping service is accessible via an internal network such as an Intranet of the computing resource service provider. In some embodiments, the client of application that causes the usage of computing resources lacks direct access to the data mapping service (e.g., the client of the downstream service lacks access to a web API that is implemented by the data mapping service).

In an embodiment, the downstream service defines 602 a derivation instruction that comprises a predicate schema and a function schema. A schema may refer to a format usable to determine data and/or executable code. In an embodiment, the derivation instructions encode a reference (e.g., a pointer) to the executable code for the predicate and/or the function. For example, derivation instructions may encode a memory address where executable code for the predicate and/or function can be retrieved, loaded, and executed.

The predicate schema may refer to a schema or format that defines a predicate. A key schema may be used to define fields that could be retrieved from a source usage record which may be used as the predicate. The predicate may be referred to as a programmatic predicate. In an embodiment, the predicate is a functional interface containing exactly one abstract method. In various embodiments, such as those in accordance with Java 8 and later, a predicate may be used as the assignment target for a lambda expression. A predicate may be a function that returns a Boolean output value (e.g., TRUE or FALSE) that is dependent on the evaluation of one or more logical statements. Generally speaking, the output value is dependent on one or more input values to the function, although such need not be the case (for example, a predicate may simply always return TRUE). In an embodiment, the predicate is a computer-executable routine (e.g., executable code) that is applied to a computing resource usage record to determine if any derivation records should be applied. In an embodiment, the predicate refers to a Java Predicate for a derivation of a computing resource usage record as such:

Predicate<Map<String, String>>isInstanceUsage=
    return r→r.get("usageType").equals("InstanceUsage");

The illustrative example of a predicate shown above may be implemented according to Java 8 and later. The example shown above illustrates a predicate where metering records are represented as a mapping of key-value strings and includes a key "usageType" where the predicate can be used to filter for usage types that match the value "InstanceUsage"—this is merely an illustrative example and other types of predicates are contemplated within the scope of this disclosure.

The function schema may refer to a schema or format that defines a function. A value schema may include two parts, a common field that defines files to be derived and additional data that defines data fields to be used for customized derivations. The key schema may be used as a function schema. A function may refer to any suitable routine and may be applied to a source metering record. The function can be used to generate additional metering records. In an embodiment, a function is represented as a Java construct. For example, the function may override (e.g., replace) one or more values of the key-value pairs representing usage records. In an embodiment, the function is used to generate a derivative record which replaces a usage record that was obtained from a batch of records obtained from a data stream. In some embodiments, the function generates a record that is in addition to the usage record. An illustrative example of a function implemented according to Java 8 or higher may be in accordance with the following:

Function<Map<String,String>, List<Map<String, String>>>filtrationFunction=
    return r→{r.put("usageType", "FreeUsage"); Lists.newArrayList(r); };

In an embodiment, the derivation instructions are determined by a customer of the downstream service in any suitable manner. For example, the customer, via a client computer system, may access a command line interface or a graphical user interface that allows the user to define or specify the predicate and/or function. The downstream service, in some cases, exposes tools such as a client SDK that the customer can use to generate, compile, test, and validate computer-executable code, thereby validating prospective predicates and functions prior to defining the derivation instructions. In an embodiment, the customer (e.g., the customer using a client computer system having installed thereon a client SDK for the downstream service) accesses a webpage that provides, in a graphical setting (e.g., web browser) a pre-defined set of predicates and/or functions. In an embodiment, the user is able to customize some or all fields for a derivation instruction for example, the customer may fill in a first data field specifying a record key to filter on, a second data field that specifies an operation to perform (e.g., to replace filtered records, to create new records derived from the filtered records), and a third data field that specifies how to perform the operation (e.g., in the case of a transformation function, what value(s) should be inserted to the filtered records). The customer, in an embodiment, provides mapping data to the data mapping service that indicates the mapping of predication data and derivation data. In an embodiment, this is used for a one-to-one mapping derivation. In other use cases, it can be treated as a customized derivation.

Upon defining, determining, or otherwise obtaining derivation instruction, the downstream service may make the derivation instructions available to a data mapping service. The instructions may be transmitted via one or more networks to the data mapping service for example, a customer may submit a web API command via the Internet that is received by the downstream service which routes the derivation instructions to the data mapping service via an Intranet. It should be noted that any suitable communications network can be utilized by the downstream service to provide the derivation instructions to the data mapping service. In an embodiment, the data mapping service receives the derivation instructions.

The data mapping service may receive derivation instructions comprising a predicate schema and a function schema and store 604 the derivation instructions using any suitable data storage system such as a data storage service of a computing resource service provider (e.g., the same computing resource service provider that the data mapping service is hosted on). In an embodiment, the data mapping service performs a schema validation on the predicate schema and the function schema as a precondition to storing the derivation instructions.

A deriver system as illustrated in FIG. 6 may monitor 606 a data stream that collects usage records of computing resources. More generally, the system may obtain one or more usage records from the data stream. Usage records may include information associated with particular usages of computing resources of the computing resource service provider, such as key-value pairs described above in connection with FIG. 1. In an embodiment, usage of computing resources such as compute resources and data storage resources generates usage records (metering records) which are collected and aggregated by a metering service. A batch of records may refer to usage records collected over a fixed time interval, such as on a per-second, per-minute, or per-hour basis. A batch of records can be restricted or filtered to include only records having specific properties (e.g., only records associated with a particular customer of the computing resource service provider). In an embodiment, a metering service collects usage records from resource service providers (e.g., a compute service and a data service) using either a push or pull model, and the deriver system monitors the data stream by accessing the usage records via the metering service. In an embodiment, the deriver system performs the monitoring in a continuous basis (e.g., in an ongoing manner, so that the monitoring of the data stream is not predicated on the occurrence of a specific event). In an embodiment, the deriver system monitors the data stream at fixed intervals of time.

The downstream service may utilize 608 computing resources. In some cases, the downstream service is a service that uses other services for example, to execute a software application that implements functionality that a client is able to utilize, the downstream service may instantiate on a fleet of virtual machine instances (e.g., using a compute service) and load the software application on the fleet of virtual machine instances to run the application. As another example (which may be an extension of the previous example), the downstream service may persist customer data using a data storage service that provides access to one or more persistent storage mediums, such as hard disk drives, magnetic cassettes, magnetic tape, magnetic disk storage or other magnetic storage devices. As a result of using these underlying services (e.g., compute service to instantiate virtual machine instance, data storage service to store data), metering records (e.g., usage records) may be generated and submitted to a metering service. These usage records may be aggregated to be part of a data stream which the deriver system monitors. Accordingly, the deriver system may detect 610 the usage of the computing resource that was referenced above (e.g., the provisioning of virtual machine instances to run software applications on behalf of the downstream service).

In an embodiment, the system obtains a derivable batch of records from a metering batch service via an internal API that is accessible to the deriver but not to external customers and obtains a mapping derivation from a client identifier associated with the batch of records or a portion thereof. The deriver system may determine whether 612 a batch of records (or portion thereof) are whitelisted for derivation. The determination may be made by querying the usage records for a client identifier and requesting mapping data from the data mapping service that corresponds to the client identifier. If the data mapping service provides an indication that there is no mapping record (e.g., by providing a null value, indicating a failure, or any other suitable signal) then the system may conclude that no derivation is required and continues monitoring subsequent batches of records from the data stream. However, if the data mapping service provides an indication that the record or records are whitelisted for derivation (e.g., by returning mapping data for the derivation), the system may proceed with the derivation.

Proceeding with the derivation may include obtaining 614 derivation instructions. The derivation instructions may be obtained in any suitable manner. For example, the deriver may provide the client identifier to the data mapping service and the data mapping service may receive the request and retrieve, from a database, the corresponding database entries having the instructions under the namespace specified by the client identifier. The data mapping service may provide 616 the derivation instructions, mapping data, and any other additional data requested by the deriver in response to a request that includes or otherwise indicates the client identifier. The derivation instructions may be according to those previously defined by the downstream service and stored on or on behalf of the data mapping service.

Upon receiving the derivation instructions, the system may use the derivation instructions (or a portion thereof) to determine and evaluate whether 618 a predicate applies. The derivations instructions may include key schema data that defines fields that can be retrieved from the source usage record. The predicate may be evaluated using one or more fields (e.g., values) of a usage record to determine a Boolean output (e.g., TRUE or FALSE) that indicates whether the predicate applies or not. If the predicate does not apply, the system may conclude that no derivation is required and to continue monitoring subsequent batches of records from the data stream. However, if the predicate applies, then the system may apply 620 the function indicated in the derivation instructions to the usage record to generate a derived usage record.

The derivation instructions may include a value schema that defines fields to derive, as well as (e.g., optionally) data fields to be used for customized derivation, which are used to determine the function to execute. The function may, for example, generate the derived usage record by replacing the usage record from the batch with a derived usage record that replaces the value of some or all fields, according to the function schema. The function, for example, may generate a new usage record based on the usage record from the batch and replacing one or more field values, thereby generating a derived usage record that is in addition to the usage record from the batch.

Upon generating the derived usage record, the deriver may make 622 the derived usage record available as part of the data stream. In an embodiment, the system makes the derived usage record available to the data stream by storing the derived usage record in a data store and causing a notification to be transmitted to another system or service that receives the notification, obtains the derived usage record from the data store, and inserts the derived usage record to the data stream. The data store described above may be stored separately from the usage records being generated and provided to the metering service (e.g., in different data storage buckets of a data storage service). The notification may be transmitted and delivered using a notification service of the computing resource service provider. The another system described above that receives and processes the derived usage record may be a batch aggregation service, such as those described elsewhere in this disclosure. The notification service may deliver messages to subscribing endpoints and clients using a push notification where subscribers can receive notification messages without being required to specifically request the push notification be provided (e.g., a request to subscribe for all notifications on a specific topic or for a specific channel is sufficient for a client to receive notification messages).

Figure 7:
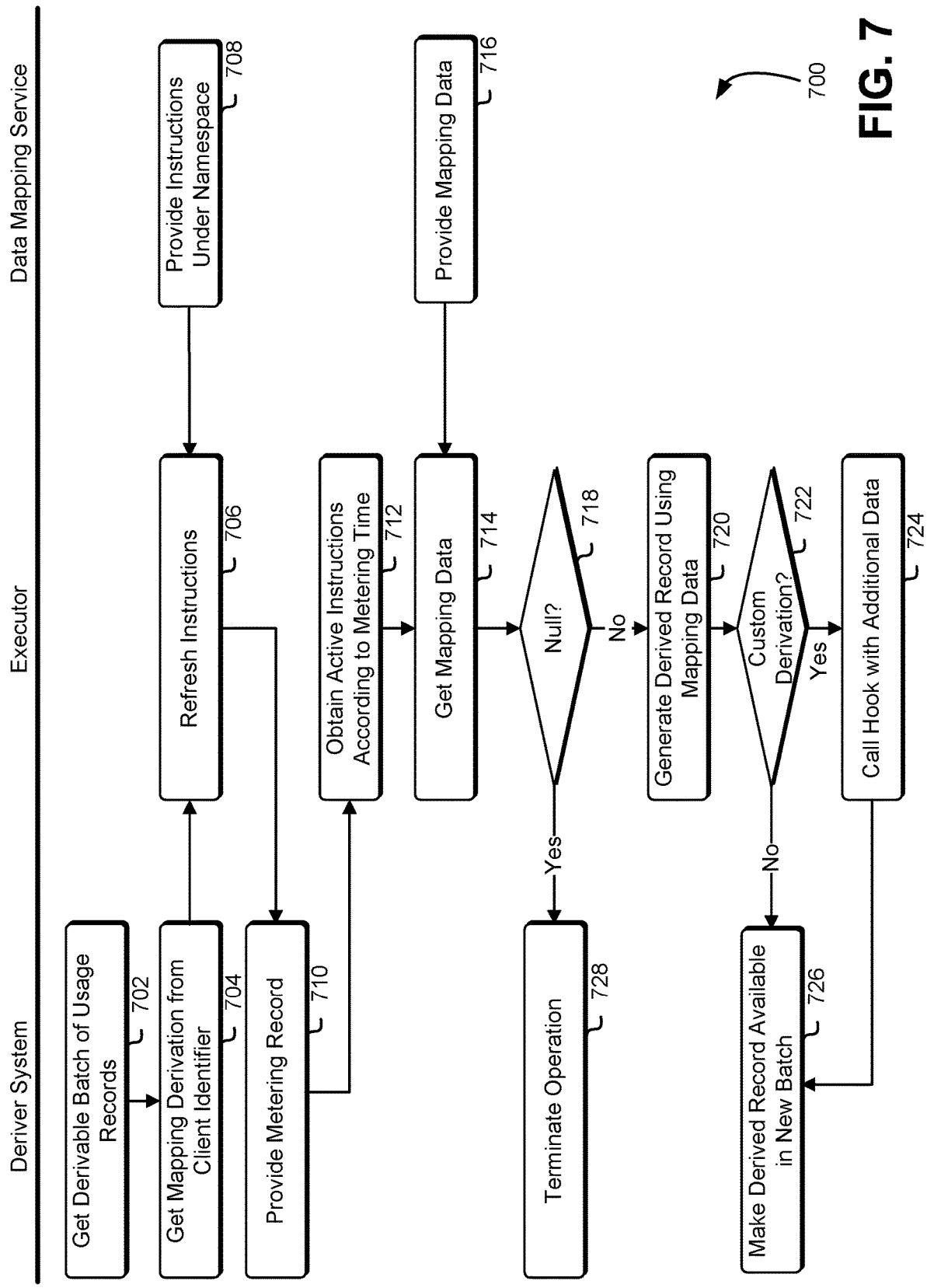
FIG. 7 shows an illustrative example of a process for deriving usage records in accordance with an embodiment.

FIG. 7 shows an illustrative example of a process 700 for deriving usage records in accordance with an embodiment. The process 700 may be implemented using a deriver system, executor, and data mapping service. In an embodiment, the deriver system, executor, and data mapping service are computing devices and servers that are implemented in accordance with FIG. 8. Some or all of the process 700 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 700 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

In an embodiment the deriver system gets 702 or otherwise obtains a derivable batch of usage records. The deriver system, in an embodiment, queries a metering batch service to obtain a batch of records from a data stream where records are batched based on a time interval (e.g., records are batched in a per-minute or per-hour basis). The deriver system may query one or more records of the batch to get 704 mapping derivation from a client identifier. The client identifier may be associated with a service team that determines mapping data and derivation instructions. The deriver system may make a synchronous call to the executor to refresh 706 derivation instructions, and the executor may make a second synchronous call to the data mapping service for all derivation instructions under the namespace specified by the client identifier. The data mapping service may query a database that stores key-value pairs for the requested derivation instructions and provide 708 them to the executor in response to the request. The executor may receive the derivation instructions and return a void response to the deriver system (e.g., the executor acknowledges completion of the request but does not pass the derivation instructions to the deriver system).

The deriver system may provide 710 a usage record of the batch of records to the executor as part of a synchronous call. Records may be selected from the batch of records in sequential order (e.g., ascending or descending order, according to a timestamp such as the creation timestamp of the record corresponding when the client requested an operation). The executor may receive the usage record and obtain 712 the active derivation instructions according to metering time. The active derivation instructions may be the derivation instructions that, as illustrated in FIG. 4, were previously obtained by the executor. In some embodiments, common derivation queries for the latest version of the derivation instruction that was active at record metering time, wherein active means that the record metering time is between the instruction's activation effective time and the deactivation effective timestamp or the next version activation timestamp (as applicable).

In an embodiment, the executor gets 714 or otherwise obtains mapping data from the data mapping service using the client identifier. The executor may submit a request to the data mapping service for mapping data (e.g., by specifying a client identifier or namespace) and the data mapping service provides 716 mapping data in response to the request. These steps may be implemented according to techniques described in connection with FIGS. 1-6. The mapping data for the record may be obtained by a database in or otherwise accessible to the data mapping service. In an embodiment, the executor determines whether the mapping 718 data is empty if the mapping data is empty (e.g., null), no derivation is required and the executor terminates operation 728 as no additional operations need to be performed. However, if the mapping data is non-null or another suitable indication is used to determine derivation is still required, the executor may continue with the derivation process. The mapping data may encode a one-to-one mapping derivation that is used to generate 720 a derived usage record from the original usage record. In some cases, one usage record is used to generate multiple derived usage records. The one or more derived usage records may be provided to the deriver system. In an embodiment, after a common derivation (e.g., one-to-one mapping) is performed, the system checks whether 722 to perform a custom derivation. In an embodiment, a common derivation class is extended by a custom derivation class that defines hook logic and the executor calls 724 a hook with additional data (e.g., the additional data is provided as part of the mapping data) to perform a partial derivation, such as by utilizing techniques described in connection with FIGS. 1-6. The deriver system may make 726 the derived records available by putting the derived records in a new batch and sending them to a batch aggregation service by, for example, storing the derived records using a data storage system and causing a notification to be transmitted to the batch aggregation service.

Figure 8:
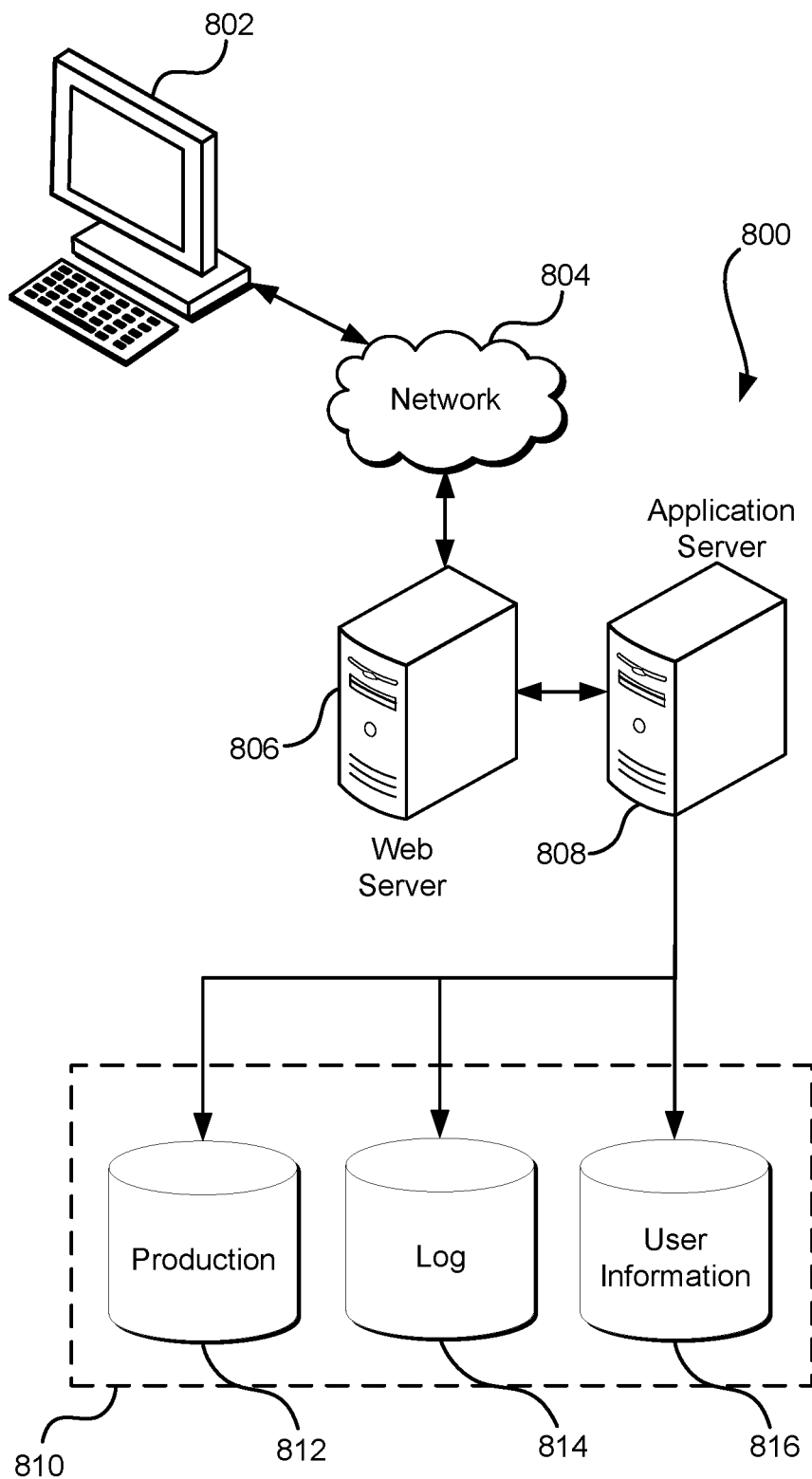
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory that stores computer-executable instructions that, if executed, cause the one or more processors to:
   obtain a record from a data stream that comprises a plurality of records comprising data generated based on tracked usage of computing resources of a computing resource service provider, the record at least comprising generated data corresponding to data processed by the computing resources of the computing resource service provider on behalf of a client of the computing resource service provider, and wherein the record is associated with the client of the computing resource service provider;

determine, based on a key-value mapping, a predicate to apply to the record, the predicate comprising a computer-executable routine, the key-value mapping associated with a mapping data storage that comprises a plurality of derivation instructions provided by the client of the computing resource service provider, and wherein the key-value mapping is included in at least one of the plurality of derivation instructions;

execute the computer-executable routine of the predicate to identify a function of a plurality of functions for performing a set of operations on the record; and execute the function in connection with the record to generate a second record.

2. The system of claim 1, wherein the record comprises a key-value pair including information of one or more usages of the computing resources of the computing resource service provider by the client of the computing resource service provider.

3. The system of claim 1, wherein the computer-executable instructions that, if executed, further cause the one or more processors to make the second record available to a database system.

4. The system of claim 1, wherein the computer-executable instructions further include instructions that, if executed, cause the one or more processors to obtain the plurality of derivation instructions from the client, wherein each of the plurality of derivation instructions comprise:

a predicate schema usable to determine the predicate; and
a function schema usable to determine the function.

5. The system of claim 1, wherein at least one of the predicate schema and the function schema is persisted in the mapping data storage.

6. The system of claim 1, wherein the computer-executable instructions to execute the function further include instructions that, if executed, cause the one or more processors to execute custom hook logic provided by the client.

7. The system of claim 1, wherein the predicate is a function that, as a result of evaluation, determines a Boolean output.

8. The system of claim 1, wherein the computer-executable instructions further include instructions that, if executed, cause the one or more processors to:

obtain filter data associated with the client, wherein the filter data identifies an attribute;
determine whether the record includes the attribute; and
as a result of the attribute being present in the record, apply the predicate.

9. A non-transitory computer-readable storage medium comprising executable instructions that, as a result of being executed by one or more processors of a computer system, cause the computer system to:

obtain a first record comprising data indicating tracked usage of a computing resource of a computing resource service provider associated with a client computing entity of the computing resource service provider;

determine, based on a key-value mapping, a predicate to apply to the first record, the key-value mapping associated with a mapping data storage that comprises a plurality of derivation instructions provided by a client of the computing resource service provider, and wherein the key-value mapping is included in at least one of the plurality of derivation instructions;

execute the predicate to identify a function of a plurality of functions to execute, wherein the function, as a result of being executed, performs a set of operations on the first record; and execute the function in connection with the first record to generate a second record.

10. The non-transitory computer-readable storage medium of claim 9, wherein the instructions further comprise instructions that, as a result of being executed by the one or more processors, cause the computer system to:

obtain, from the client computing device, mapping data comprising a one-to-one mapping and an identifier associated with the client;

verify the one-to-one mapping is supported; and as a result of verifying the mapping data is supported, cause the mapping data to be stored in the mapping data storage.

11. The non-transitory computer-readable storage medium of claim 10, wherein the instructions to execute the function further include instructions that, as a result of being executed by the one or more processors, cause the computer system to:

obtain, using the identifier, the mapping data from the mapping data storage; and cause the second record to be generated based on the one-to-one mapping.

12. The non-transitory computer-readable storage medium of claim 10, wherein:

the mapping data storage supports a caching layer; and the mapping data is obtained from the caching layer of the mapping data storage.

13. The non-transitory computer-readable storage medium of claim 9, wherein the instructions to execute the function include instructions that, if executed, cause the computer system to modify one or more key-value pairs of the first record according to one to one mapping data provided by the client computing entity.

14. The non-transitory computer-readable storage medium of claim 9, wherein the instructions further include instructions that, if executed, cause the computer system to make the first record available to a data stream.

15. The non-transitory computer-readable storage medium of claim 9, wherein the predicate is in accordance with a Java predicate.

16. The non-transitory computer-readable storage medium of claim 9, wherein the client computing entity is a service of the computing resource service provider that utilizes one or more other services of the computing resource service provider.

17. The non-transitory computer-readable storage medium of claim 9, wherein the usage tracked by the first record at least corresponds to data processed by the computing resource of the computing resource service provider on behalf of a client of the computing resource service provider.

18. The non-transitory computer-readable storage medium of claim 9, wherein the first record comprises a key-value pair including information of one or more usages of the computing resource of the computing resource service provider by a client of the computing resource service provider.

19. A computer-implemented method, comprising:
obtaining a first record comprising data indicating tracked usage of a computing resource of a computing resource service provider associated with a client computing entity of the computing resource service provider;
determining, based on a key-value mapping, a predicate to apply to the first record, the predicate comprising computer-executable instructions, the key-value mapping associated with a mapping data storage that comprises a plurality of derivation instructions provided by a client of the computing resource service provider, and wherein the key-value mapping is included in at least one of the plurality of derivation instructions;
executing the computer-executable instructions of the predicate to identify a function of a plurality of functions to execute, wherein the function, as a result of being executed, performs a set of operations on the first record; and
executing the function in connection with the first record to generate a second record.

20. The computer-implemented method of claim 1, further comprising:
obtaining, from the client computing device, mapping data comprising a one-to-one mapping and an identifier associated with the client;
verifying the one-to-one mapping is supported; and
as a result of verifying the mapping data is supported, causing the mapping data to be stored in the mapping data storage.

21. The computer-implemented method of claim 20, wherein executing the function comprises:
obtaining, using the identifier, the mapping data from the mapping data store; and
causing the second record to be generated based on the one-to-one mapping.

22. The computer-implemented method of claim 20, wherein:
the database system supports a caching layer; and
the mapping data is obtained from the caching layer of the mapping data storage.

23. The computer-implemented method of claim 19, wherein the usage tracked by the first record at least corresponds to data processed by the computing resource of the computing resource service provider on behalf of a client of the computing resource service provider.

24. The computer-implemented method of claim 19, wherein the first record comprises a key-value pair including information of one or more usages of the computing resource of the computing resource service provider by a client of the computing resource service provider.

\* \* \* \* \*